(12) United States Patent
Sabne et al.

(10) Patent No.: US 11,334,469 B2
(45) Date of Patent: May 17, 2022

(54) COMPOUND CONDITIONAL REORDERING FOR FASTER SHORT-CIRCUITING

(71) Applicant: Microsoft Technology Licensing, LLC, Redmond, WA (US)

(72) Inventors: Amit Jayant Sabne, Seattle, WA (US); Eric Avi Brumer, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 15/953,334

(22) Filed: Apr. 13, 2018

(65) Prior Publication Data
US 2019/0317881 A1    Oct. 17, 2019

(51) Int. Cl.
*G06F 9/44* (2018.01)
*G06F 11/36* (2006.01)
*G06F 8/41* (2018.01)
*G06F 9/30* (2018.01)

(52) U.S. Cl.
CPC ............ *G06F 11/3616* (2013.01); *G06F 8/43* (2013.01); *G06F 9/30058* (2013.01)

(58) Field of Classification Search
CPC .... G06F 8/43; G06F 9/30058; G06F 11/3616; G06F 717/126
See application file for complete search history.

(56) References Cited

U.S. PATENT DOCUMENTS

| 5,613,117 A * | 3/1997 | Davidson ................ G06F 8/433 717/144 |
| 7,716,630 B2 * | 5/2010 | Wholey .................... G06F 8/34 717/100 |
| 7,725,885 B1 * | 5/2010 | Pradhan .............. G06F 9/45516 717/148 |
| 7,747,992 B2 * | 6/2010 | Peri ........................ G06F 8/443 717/151 |

(Continued)

OTHER PUBLICATIONS

Bacon, et al., "Compiler Transformations for High-Performance Computing", In Journal of ACM Computing Surveys, vol. 26, Issue 4, Dec. 1994, pp. 345-420.

(Continued)

*Primary Examiner* — Lewis A Bullock, Jr.
*Assistant Examiner* — Mohammad H Kabir
(74) *Attorney, Agent, or Firm* — Alleman Hall Creasman & Tuttle LLP

(57) ABSTRACT

A computing device is provided, including a processor configured to receive source code at a compiler. The source code may include at least one compound conditional having a plurality of conditions. For each condition of the plurality of conditions, the source code may further include a respective code block including instructions to evaluate the condition. For each ordering of a plurality of orderings of the plurality of conditions, the processor may determine that the ordering satisfies one or more legality constraints. For each ordering of the plurality of orderings that satisfy the one or more legality constraints, the processor may determine a (Continued)

respective estimated computational cost for that ordering. The processor may reorder the plurality of conditions to have an ordering that has a lowest estimated computational cost of the plurality of orderings that satisfy the one or more legality constraints.

22 Claims, 6 Drawing Sheets

(56) References Cited

U.S. PATENT DOCUMENTS

| | | | |
|---|---|---|---|
| 7,818,720 B2* | 10/2010 | Gan | G06F 8/443 |
| | | | 717/130 |
| 8,307,197 B2 | 11/2012 | Koch, III | |
| 9,274,771 B1 | 3/2016 | Kalogeropulos et al. | |
| 2002/0095669 A1* | 7/2002 | Archambault | G06F 8/4435 |
| | | | 717/157 |
| 2005/0097546 A1* | 5/2005 | Johnson | G06F 8/4442 |
| | | | 717/177 |
| 2007/0113220 A1* | 5/2007 | Makiyori | G06F 8/41 |
| | | | 717/136 |
| 2007/0174830 A1* | 7/2007 | Gan | G06F 8/443 |
| | | | 717/153 |
| 2008/0127149 A1* | 5/2008 | Kosche | G06F 8/443 |
| | | | 717/158 |
| 2010/0114915 A1* | 5/2010 | Gorton, Jr. | G06F 11/3476 |
| | | | 707/752 |
| 2011/0099542 A1* | 4/2011 | Branda | G06F 11/301 |
| | | | 717/154 |
| 2017/0123775 A1* | 5/2017 | Xu | G06F 8/451 |
| 2017/0242776 A1* | 8/2017 | Nakaike | G06F 11/3608 |
| 2020/0004514 A1* | 1/2020 | Yu | G06F 9/30123 |

OTHER PUBLICATIONS

Ghodrat, et al., "Short-Circuit Compiler Transformation: Optimizing Conditional Blocks", In Proceedings of Asia and South Pacific Design Automation Conference, Jan. 23, 2007, pp. 504-510.

Jones, Simon L. Peyton, "Compiling Haskell by Program Transformation: A Report from the Trenches", In Proceedings of European Symposium on Programming, Apr. 22, 1996, pp. 18-44.

"International Search Report and Written Opinion Issued in PCT Application No. PCT/US2019/021719", dated Jun. 5, 2019, 14 Pages.

* cited by examiner

COMPOUND CONDITIONAL REORDERING FOR FASTER SHORT-CIRCUITING

BACKGROUND

A compound conditional is a code structure in which two or more conditions are checked in order to determine whether to execute one set of instructions or another set of instructions. For example, a compound conditional may be included in an "if" statement, a "for" loop, or a "while" loop. Checking a compound conditional may include checking whether each of the two or more conditions is true. For example, a compound conditional may have the form "if (a && b)" or "if (a||b)."

Conditions in a compound conditional are evaluated at run-time in the order in which they are presented in the code. Some conditions may be more computationally expensive to check than others. A programmer may list the least computationally expensive conditional first in order to avoid checking the more computationally expensive condition when such evaluation becomes unneeded based on the first result, to save processing time. However, when writing source code that includes a compound conditional, a programmer may not know which conditions of the compound conditional are more expensive to check than others. As a result, the conditions may be arranged in a suboptimal order, i.e., an expensive conditional may be evaluated before an inexpensive conditional. This can result in wasted processing resources, and slower execution of code.

Consider the following compound conditional:

```
If ( condition1 && condition2 && condition3) {
} else {
}
```

Every conditional is a Boolean predicate. Therefore, the conditions can be compounded as either conjunctions or disjunctions.

In the above code example, a basic code generation scheme will first compute expressions that compute condition1, condition2, and condition3. Then, the generated code will perform the "&&" operations to compute the final, single condition value, based upon which, a decision will be made whether the IF code should be executed, or the ELSE code should be executed.

Some existing compilers use condition short-circuiting techniques for optimization. Short-circuiting realizes that if condition1 was false, then there is no need to compute the expressions that calculate condition2 and condition3. It then accordingly creates jumps. Short-circuiting saves the computational cost of evaluating the additional condition variables. The generated code will look like:

Compute expression that calculates condition1
If !condition1, jump to ELSE code
Compute expression that calculates condition2
If !condition2, jump to ELSE code
Compute expression that calculates condition3
If !condition3, jump to ELSE code
IF CODE
GOTO CONDITION REGION END
ELSE CODE
REGION END: . . .

However, even though compilers may use such short-circuiting techniques, developers may not be aware of the respective computational costs of different orderings. Thus, inefficient code may be written and compiled when short-circuiting would have resulted in more efficient code.

SUMMARY

According to one aspect of the present disclosure, a computing device is provided, the computing device including a processor configured to receive source code at a compiler. The source code may include at least one compound conditional having a plurality of conditions. For each condition of the plurality of conditions, the source code may further include a respective code block including instructions to evaluate the condition. For each ordering of a plurality of orderings of the plurality of conditions, the processor may be further configured to determine that the ordering satisfies one or more legality constraints. For each ordering of the plurality of orderings that satisfy the one or more legality constraints, the processor may be further configured to determine a respective estimated computational cost for that ordering. The processor may be further configured to reorder the plurality of conditions to have an ordering that has a lowest estimated computational cost of the plurality of orderings that satisfy the one or more legality constraints.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
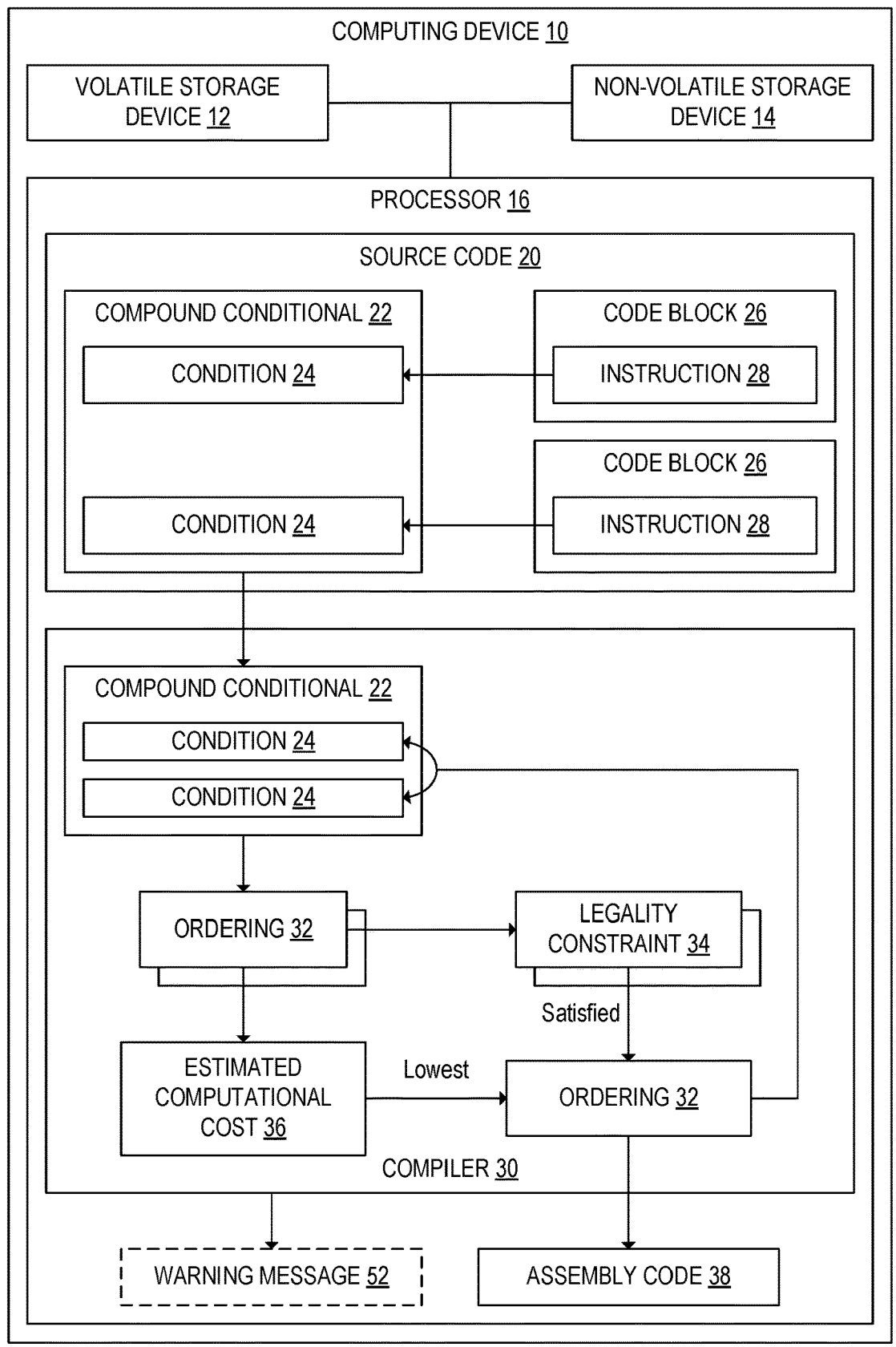
FIG. 1 shows an example embodiment of a computing device, according to one embodiment of the present disclosure.

In order to address the challenges discussed above, a computing device is provided. FIG. 1 shows an example embodiment of a computing device 10, which may include a volatile storage device 12, a non-volatile storage device 14, and/or a processor 16. The volatile storage device 12 and the non-volatile storage device 14 may each include memory addresses configured to store data. The processor 16 may be configured to run a compiler 30 configured to receive source code 20 and convert the source code 20 into assembly code 38. Conversion of source code 20 into assembly code 38 when the source code 20 includes at least one compound conditional 22 is described herein with reference to the systems and methods shown in the figures of the present disclosure.

Figure 2:
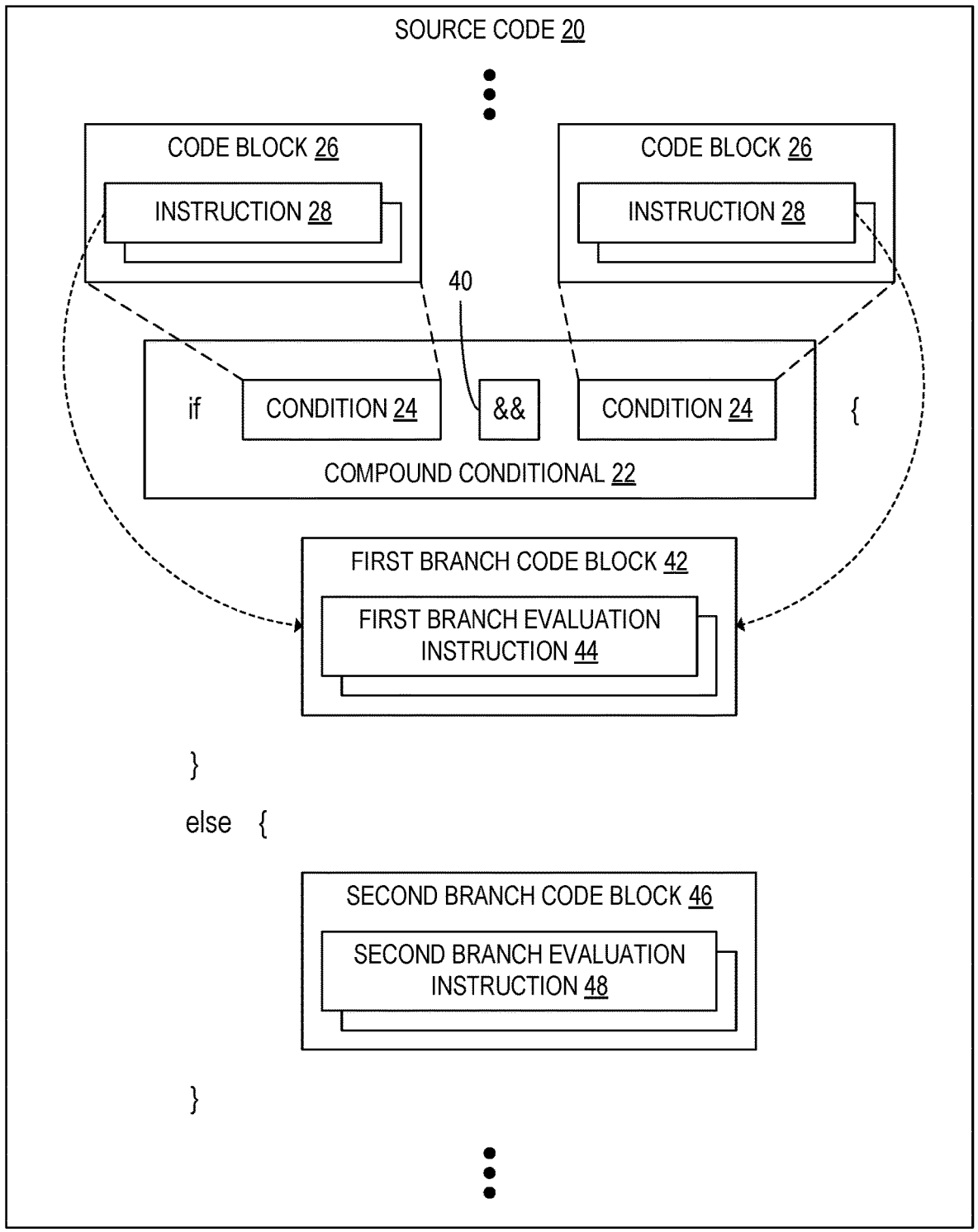
FIG. 2 shows example source code including an "if" statement, according to the embodiment of FIG. 1.

The example source code 20 of FIG. 1 is shown in further detail with reference to FIG. 2. As shown in FIGS. 1 and 2, the example source code 20 includes a compound conditional 22 in the form of an "if" statement. The source code 20 received by the compiler 30 may include at least one compound conditional 22. The compound conditional 22 may include a plurality of conditions 24, each of which may have a Boolean value (true or false). For each condition 24 of the plurality of conditions 24, the source code 20 may include a respective code block 26 including one or more instructions 28 to evaluate the condition 24. When the one or more instructions 28 are evaluated, the code block 26 may return a Boolean value for the condition 24. In some embodiments, each code block 26 may be a basic block within which no branches occur. Alternatively, at least one code block 26 may include a plurality of basic blocks.

The compound conditional 22 may return a Boolean value based on the Boolean values of the plurality of conditions 24. As shown in FIG. 2, the source code 20 may further include a first branch code block 42 including one or more first branch evaluation instructions 44 configured to be executed when the plurality of conditions 24 are true. In the embodiment of FIG. 2, the compound conditional 22 includes a logical operator 40, shown here as an AND (&&) logical operator. However, in other embodiments, the compound conditional 22 may be expressed using another logical operator 40, such as OR, XOR, or NAND. The Boolean value of the compound conditional may be evaluated by applying the logical operator 40 to the plurality of conditions 24. The source code 20 may further include a second branch code block 46 including one or more second branch evaluation instructions 48 configured to be executed when at least one condition 24 of the plurality of conditions 24 is false. As shown in FIG. 2, the second branch code block 46 may be an "else" branch of an "if" statement.

Although the compound conditional 22 of FIGS. 1 and 2 is shown with two conditions 24, other numbers of conditions 24 are also contemplated. In some embodiments, the compound conditional 22 may include three or more conditions 24. In such embodiments, the compound conditional 22 may further include two or more logical operators 40 that may be applied to the conditions 24 to evaluate the compound conditional 22.

In addition to the compound conditional 22, the first branch code block 42, and the second branch code block 46, the source code 20 may include other code blocks, as indicated by the ellipses shown before the compound conditional 22 and after the second branch code block 46 in FIG. 2.

Returning to FIG. 1, the compound conditional 22 may be sent to the compiler 30. The compiler 30 may be configured to determine a plurality of orderings 32 of the plurality of conditions 24 included in the compound conditional 22. In some embodiments, the compiler 30 may determine each possible ordering 32 of the plurality of conditions 24. In other embodiments, the compiler 30 may determine only a subset of all possible orderings 32 of the conditions 24.

As a corollary of Rice's theorem, there does not exist an algorithm that can always determine, for any compound conditional 22, which condition 24 has the lowest computational cost. However, a condition 24 that is likely to have the lowest computational cost may be identified using heuristic techniques. Such heuristic techniques may be based on syntactic properties of the one or more instructions 28 included in the respective code blocks 26 of each of the conditions 24.

For each ordering 32 of the plurality of orderings 32 of the conditions 24, the processor 16 may be further configured to determine that the ordering 32 satisfies one or more legality constraints 34. A legality constraint 34 is defined here as a constraint based on one or more syntactic properties of one or more conditions 24 with a particular ordering 32 such that when the one or more conditions 24 do not satisfy the legality constraint 34, the processor 16 is configured to prevent the compiler 30 from outputting assembly code 38 with that ordering 32. Thus, by determining which orderings 32 satisfy the one or more legality constraints 34, the processor 16 may prevent errors in the assembly code 38 that may result from reordering the conditions 24. Example legality constraints 34 are discussed below with reference to FIG. 2.

In embodiments in which the source code 20 includes a first branch code block 42 including one or more first branch evaluation instructions 44 configured to be executed when the plurality of conditions 24 are true and a second branch code block 46 including one or more second branch evaluation instructions 48 configured to be executed when at least one condition 24 of the plurality of conditions 24 is false, the one or more legality constraints 34 include a constraint 34 that the source code 20 includes one first branch code block 42 and one second branch code block 46. When the above legality constraint 34 is satisfied, the source code 20 does not include more than one first branch code block 42 and/or more than one second branch code block 46. Additionally or alternatively, the one or more legality constraints 34 may include a constraint that the respective code block 26 of each condition 24 includes an instruction 28 to proceed to a common target code block, shown in FIG. 2 as the first branch code block 42. Thus, the compiler 30 may prevent a change in the ordering 32 of the plurality of conditions 24 from affecting what code block is executed following evaluation of the compound conditional 22.

Figure 3:
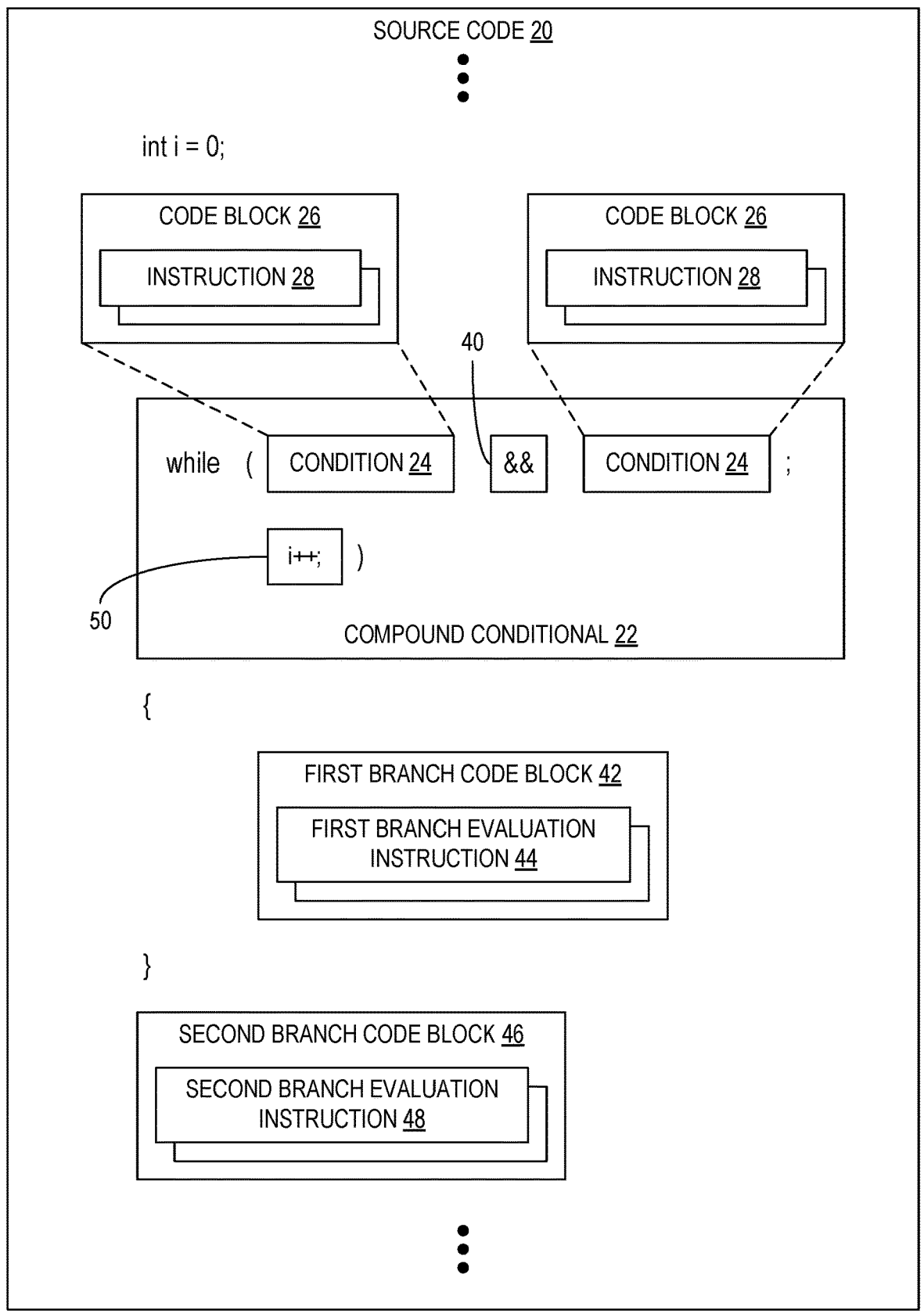
FIG. 3 shows example source code including a "while" loop, according to the embodiment of FIG. 1.

In some embodiments, as shown in FIG. 3, the source code 20 may include a portion 50 following a last code block 26 of the respective code blocks 26 of the plurality of conditions 24 and preceding the common target code block. For example, when the compound conditional 22 is included in a "while" loop, as shown in FIG. 3, the portion 50 of the source code 20 may be at least one code block including one or more instructions to increment a variable. Other functions of the portion 50 of the source code 20 are also contemplated. In such embodiments, the one or more legality constraints 34 may include a constraint that the portion 50 of the source code 20 following a last code block 26 of the respective code blocks 26 of the plurality of conditions 24 and preceding the common target code block has one entry point and one exit point. In such embodiments, the entry point may be an instruction in the portion 50 of the source code 20 where the processor 16 may begin to execute the portion 50 of the source code 20. Similarly, the exit point may be an instruction at which the processor 16 stops executing the portion 50 of the source code 20.

In some embodiments, the one or more legality constraints 34 may include a constraint that no instruction 28 calls an undefined variable. Two example scenarios in which an instruction 28 may call an undefined variable are discussed below. In one example, the undefined variable may be an untracked memory address. When an instruction 28 to dereference the untracked memory address occurs prior to an instruction 28 to track the untracked memory address, an undefined variable error may occur. In a second example, an undefined variable error may occur when an instruction 28 uses a variable prior to another instruction 28 that defines the variable.

In some embodiments, the one or more legality constraints 34 may include a constraint that no code block 26 includes an instruction 28 that is a division or remainder operation where the divisor could have a value of zero. By checking this legality constraint 34, the processor 16 may prevent division-by-zero errors resulting from reordering the conditions 24.

When no candidate reorderings included in the plurality of orderings 32 satisfy each legality constraint 34 checked by the processor 16, the compiler 30 may output a warning message 52, as shown in FIG. 1. The warning message 52 may include, in some embodiments, an indication that the compound conditional 22 could not be reordered to have a computationally cheaper ordering 32. The warning message 52 may include an indication of a location (e.g. a line number) in the source code 20 at which the compound conditional 22 occurs. In some embodiments, the compiler 30 may not output the assembly code 38 when the compiler 30 outputs the warning message 52.

For each ordering 32 of the plurality of orderings 32 that satisfy the one or legality constraints 34, the processor 16 may be further configured to determine a respective estimated computational cost 36 for that ordering 32. The respective estimated computational costs 36 of the orderings 36 may be determined based on predetermined static values assigned to the one or more instructions 28 included in each code block 26. Thus, estimated computational costs 36 of the orderings 32 may be determined without having to collect data related to historical computational costs of similar instructions.

Figure 4:
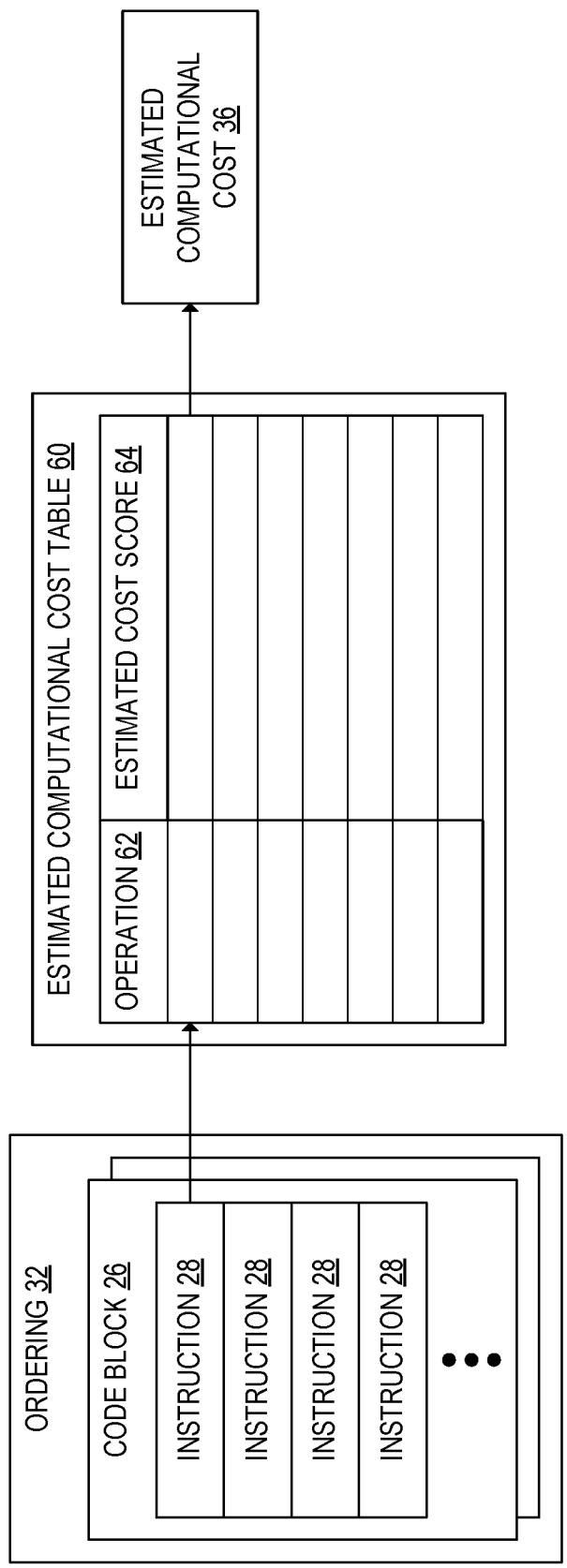
FIG. 4 shows an example of computational cost estimation, according to the embodiment of FIG. 1.

Determination of the estimated computational cost 36 according to one example embodiment is shown in further detail with reference to FIG. 4. As shown in FIG. 4, to determine the estimated computational cost 36 of a code block 26 included in a condition 24 when the plurality of conditions 24 have a particular ordering 32, the processor 16 may refer to an estimated computational cost table 60 for each instruction 28 included in the code block 26, which contains predetermined static values for each type of instruction in the code block. Thus, the estimated computational cost table 60 may include, for one or more type of operation 62, an estimated cost score 64 associated with that operation 62. The types of operations 62 may include, for example, addition, subtraction, comparison, negation, division, remainder, AND, OR, XOR, minimum, maximum, load, store, and/or one or more other operations 62. Each type of operation 62 listed in the estimated computational cost table may have an estimated cost score 64, as shown in the second column of the estimated computational cost table 60 in FIG. 4. In some embodiments, each operation may have an estimated integer cost and an estimated floating-point cost. The estimated integer cost may be the estimated cost score 64 of the operation 62 when performed using integer computation, and the estimated floating-point cost may be the estimated cost score 64 of the operation 62 when performed using floating point computation.

The processor 16 may be configured to determine a respective estimated cost score 64 for each instruction 28 included in the code block 26, typically by reference to the table discussed above. In addition, the processor 16 may determine the respective estimated cost score 64 of each instruction 28 for each code block 26 in this manner when the plurality of conditions 24 have the ordering 32. Thus, the processor 16 may be configured to assign an estimated cost score 64 to each instruction 28 included in the ordering 32. Based on the respective estimated cost scores 64 of each instruction 28, the processor 16 may determine an estimated computational cost 36 of the ordering. For example, the estimated computational cost 36 of the ordering 32 may be determined by summing the respective estimated cost scores 64 assigned to each instruction 28. Alternatively, the estimated computational cost 36 may be determined using some other formula. For example, a weighting factor may be applied to at least one estimated cost score 64.

In some embodiments, the processor 16 may determine an estimated computational cost 36 only for each ordering 32 than satisfies the one or more legality constraints 34. In other embodiments, the processor 16 may determine the estimated computational cost 36 of each ordering 32 before checking whether that ordering 32 satisfies the one or more legality constraints 34. In such embodiments, the processor 16 may be configured to discard any ordering 32 with an estimated computational cost 36 that exceeds a predetermined threshold. This estimated computational cost filtering may occur before checking for satisfaction of the one or more legality constraints 34.

The processor 16 may be further configured to determine an ordering 32 that has a lowest estimated computational cost 36 of the plurality of orderings 32 that satisfy the one or more legality constraints 34. The processor 16 may then reorder the plurality of conditions 24 to have the ordering 32 with the lowest estimated computational cost 36 of the plurality of orderings 32 that satisfy the one or more legality constraints 34. If the ordering with the lowest estimated computational cost 36 is the original ordering 32 of the plurality of conditions 24, the processor 16 may be configured to maintain the original ordering 32. If two or more orderings 32 are tied for the lowest estimated computational cost 36, the processor 16 may select one ordering 32 of the two or more orderings 32 and reorder the plurality of conditions 24 to have the selected ordering 32, or, if the original ordering 32 is included in the two or more orderings 32, maintain the original ordering 32.

In embodiments in which the estimated computational costs 36 of the respective orderings 32 are determined prior to checking whether the orderings 32 satisfy the one or more legality constraints 34, the processor 16 may be configured to sort the one or more orderings 32 by estimated computational cost 36. The processor 16 may then determine whether each ordering 32 satisfies one or more legality constraints 34 in order of ascending estimated computational cost 36 among the plurality of orderings 32. The processor 16 may check the orderings 32 for satisfaction of the one or more legality constraints 34 thusly until an ordering 32 with a lowest estimated computational cost 36 that satisfies the one or more legality constraints 34 is determined. The processor 16 may be further configured to reorder the plurality of conditions 24 to have the ordering 32 with the lowest estimated computational cost 36 that satisfies the one or more legality constraints 34. Checking estimated computational costs 36 of the orderings 32 before checking legality constraints 34 may be advantageous, for example, when differences in estimated computational costs 36 among the orderings 32 are expected to be large, and/or when the estimated computational cost 36 of an ordering 32 can be determined more quickly than whether the ordering 32 satisfies the one or more legality constraints 34.

Figure 5:
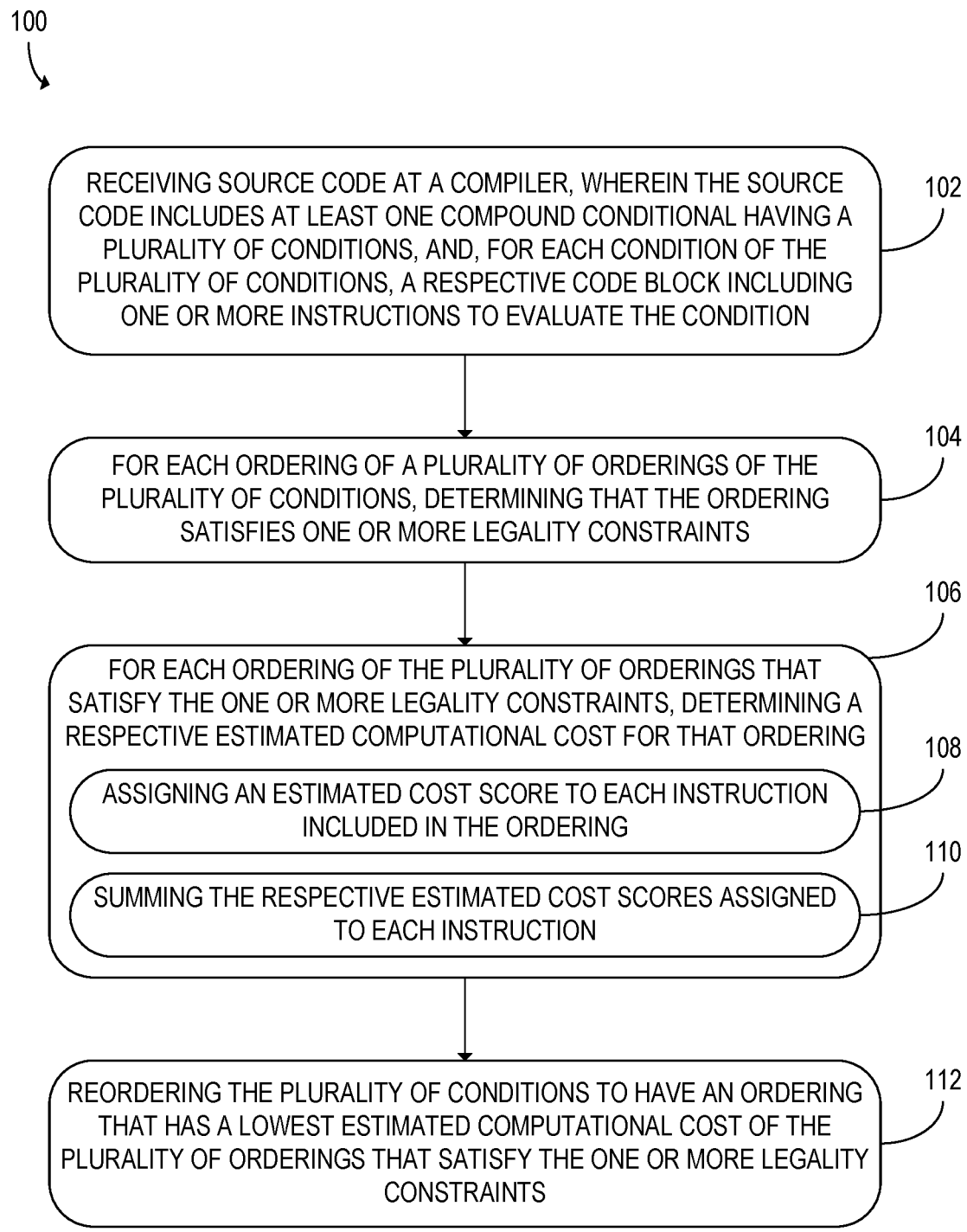
FIG. 5 shows an example method that may be executed by a processor of a computing device, according to one embodiment of the present disclosure.

FIG. 5 shows a flowchart of a method 100 performed by a processor of a computing device, according to one example embodiment. The computing device may be the computing device 10 of FIG. 1. At step 102, the method may include receiving source code at a compiler. The source code may include at least one compound conditional having a plurality of conditions. In some embodiments, the compound conditional may include three or more conditions. The compound conditional may include two or more Boolean-valued conditions and one or more logical operators, such as AND, OR, XOR, and/or NAND. The compound conditional may further include, for each condition of the plurality of conditions, a respective code block including one or more instructions to evaluate the condition. In some embodiments, each code block may be a basic block. In other embodiments, at least one code block may include a plurality of basic blocks.

At step 104, the method 100 may further include, for each ordering of a plurality of orderings of the plurality of conditions, determining that the ordering satisfies one or more legality constraints. A legality constraint is a constraint based on one or more syntactic properties of one or more conditions with a particular ordering such that when the one or more conditions do not satisfy the legality constraint, outputting of assembly code with that ordering is inhibited. As one example, the one or more legality constraints may include a constraint that the respective code block of each condition includes an instruction to proceed to a common target code block. Thus, unwanted branching that depends upon the ordering of the conditions may be prevented.

As another example, the one or more legality constraints may include a constraint that a portion of the source code following a last code block of the respective code blocks of the plurality of conditions and preceding the common target code block has one entry point and one exit point. This legality constraint may prevent the processor from skipping instructions before the entry point or after the exit point due to unwanted entry to and/or exit from the portion of the source code following the last code block and preceding the common target code block.

As another example, the one or more legality constraints include a constraint that no instruction calls an undefined variable. When a variable is defined in a first condition and subsequently called in a second condition in the original ordering of the conditions, a call to an undefined variable may occur when the second condition is moved to be before the first condition. The above legality constraint may be checked in order to determine that such a reordering is not performed.

As another example, the one or more legality constraints may include a constraint that that no code block includes an instruction that is a division or remainder operation where the divisor could have a value of zero.

In some embodiments, the source code may further include a first branch code block including one or more first branch evaluation instructions configured to be executed when the plurality of conditions are true. The source code may further include a second branch code block including one or more second branch evaluation instructions configured to be executed when at least one condition of the plurality of conditions is false. For example, when the compound conditional is included in an "if" statement, the second branch code block may be an "else" branch of the "if" statement. In such embodiments, the one or more legality constraints may include a constraint that the source code includes one first branch code block and one second branch code block, rather than a plurality of first branch code blocks and/or second branch code blocks.

At step 106, the method 100 may further include for each ordering of the plurality of orderings that satisfy the one or more legality constraints, determining a respective estimated computational cost for that ordering. In some embodiments, determining the respective estimated computational cost for each ordering may include, at step 108, assigning an estimated cost score to each instruction included in the ordering. The estimated cost scores may be determined, for example, by reading an estimated cost score associated with an operation indicated by the instruction from an estimated computational cost table. In some embodiments, a weighting factor may be applied to the estimated cost scores of one or more instructions. At step 110, the estimated computational cost of the ordering may then be determined, for example, by summing the respective estimated cost scores assigned to each instruction. In some embodiments, one or more other operations may additionally or alternatively be performed on the estimated cost scores in order to determine the estimated computational cost of the ordering.

At step 112, the method 100 may further include reordering the plurality of conditions to have an ordering that has a lowest estimated computational cost of the plurality of orderings that satisfy the one or more legality constraints. When the original ordering of the plurality of conditions satisfies the one or more legality constraints and has the lowest estimated computational cost, the method 100 may instead include maintaining the original ordering.

Although, in the systems and methods described above, the at least one compound conditional that is reordered includes two conditions, embodiments in which more than two conditions are reordered are also contemplated. For example, a compound conditional may have the form "if (a||b) && (c||d)." In such an example, the blocks "(a||b)" and "(c||d)" may be reordered such that the compound conditional becomes "if (c||d) && (a||b)." Alternatively, the conditions a, b, c, and d may be reordered such that the compound conditional becomes, in one example, "if (b||a) && (d||c)." In embodiments in which more than two conditions are evaluated, one or more conditions may have respective code blocks that include a plurality of basic blocks.

Compound conditional reordering as described above may be generalized to include reordering of code blocks that are not included a compound conditional, as shown with reference to the example code provided below. In the example, the code blocks included in the following C++ code may be reordered:

```
struct s1 {
    int c;
    int b;
    struct s2 *substr;
};
void shouldDo1(struct s1 *ptr, int pred, int bound) {
    for (int i = 0; i< bound; i++) {
        int var = ptr[i].substr->a;    // block 1; ends with conditional jump to block 3
        if (var % 2) {
            var = var*2;               // block 2; jumps to block 4
        }
        else {                         // block 3
            var = var + 7;
        }
        if (var && pred) {             // block 4 compares var and jumps to block
            ptr[i].b++;                // block 5 compares pred and jumps
        }                              // block 6 computes ptr[i].b++ and returns
        else {
            ptr[i].b = i;              // block 7 computes ptr[i].b = i and returns
```

```
        }
      }
}
```

In the example code shown above, computing "var" is more expensive than computing "pred." Thus, the example code may be made less computationally expensive to execute by reordering the code blocks in the following order: block 5, block 1, block 2, block 3, block 4, block 6, block 7. The systems and methods of legality constraint checking and computational cost estimation may be applied to determine an ordering of the code blocks that satisfies one or more legality constraints and has a lowest estimated computational cost.

To accomplish this, a computing device may be provided which is configured to execute the following method. Initially, source code including a plurality of code blocks may be received at a compiler. The source code may have an initial ordering, which is one of a plurality of possible orderings. That is, the initial ordering may be reordererd into one of a plurality of candidate reorderings. For each ordering of the plurality of orderings of the plurality of code blocks, the computing device may be configured to determine that the ordering satisfies one or more legality constraints, similar to the legality constraints discussed above. For each ordering of the plurality of orderings that satisfy the one or more legality constraints, the computing device may be configured to determine a respective estimated computational cost for that ordering, and reorder the plurality of code blocks to have an ordering that has a lowest estimated computational cost of the plurality of orderings that satisfy the one or more legality constraints. The estimated computational cost may be determined using methods similar to those described above.

Using the systems and methods described above, a computing device may determine which of a plurality of compound conditionals is the most likely to require the fewest computational resources while satisfying syntactic legality constraints. With this approach, the wasteful processing of prior systems can be avoided, which previously resulted when a complicated conditional was unnecessarily evaluated before a simple conditional which fails a test evaluation. Thus, the systems and methods described above may allow compiled code to be executed more efficiently than code compiled using previously existing methods.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
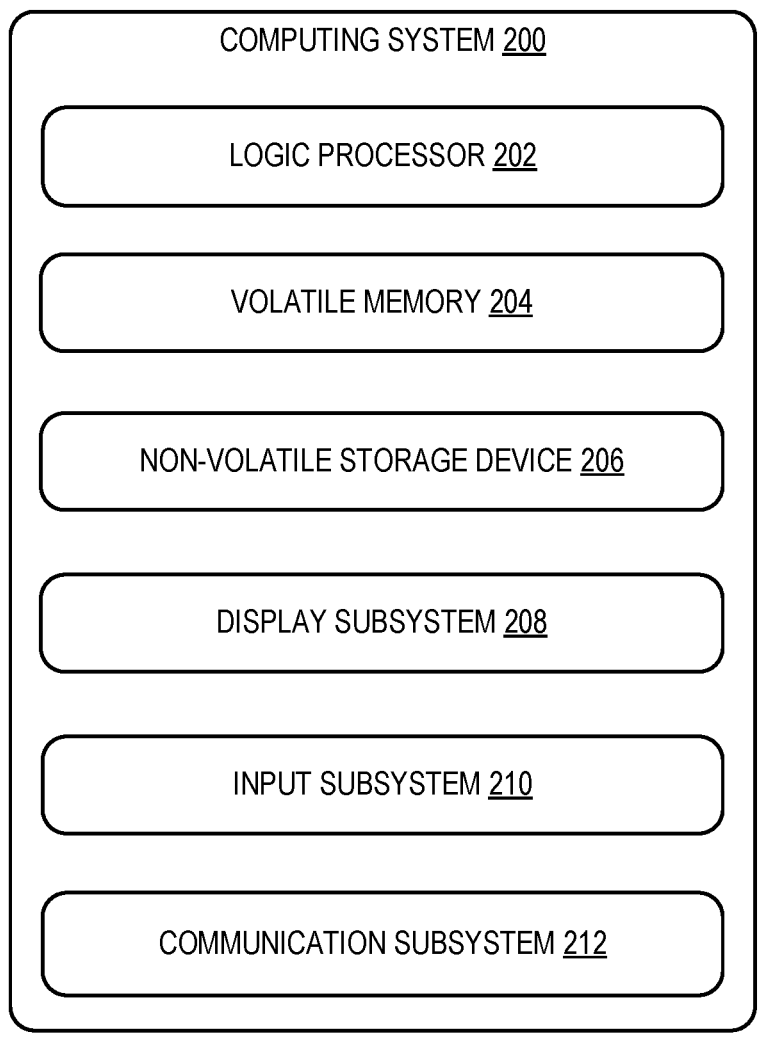
FIG. 6 shows a schematic representation of an example computing system, according to one embodiment of the present disclosure.

FIG. 6 schematically shows a non-limiting embodiment of a computing system 200 that can enact one or more of the methods and processes described above. Computing system 200 is shown in simplified form. Computing system 200 may, for example, embody the computing device 10 of FIG. 1, or may instead embody some other computing system. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented/virtual reality devices.

Computing system 200 includes a logic processor 202, volatile memory 204, and a non-volatile storage device 206. Computing system 200 may optionally include a display subsystem 208, input subsystem 210, communication subsystem 212, and/or other components not shown in FIG. 6.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 202 may include one or more physical processors (hardware) configured to execute software instructions. Additionally or alternatively, the logic processor 202 may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor 202 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 200 implemented to perform a particular function. In some cases, a program may be instantiated via logic processor 202 executing instructions held by non-volatile storage device 206, using portions of volatile memory 204. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 208 may be used to present a visual representation of data held by non-volatile storage device 206. As the herein described methods and processes change the data held by the non-volatile storage device 206, and thus transform the state of the non-volatile storage device 206, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem 210 may comprise or interface with selected natural user input (NUI) componentry. Such componentry may be integrated or peripheral, and the transduction and/or processing of input actions may be handled on-or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 212 may be configured to communicatively couple computing system 200 with one or more other computing devices. Communication subsystem 212 may include wired and/or wireless communication devices compatible with one or more different communication protocols. As non-limiting examples, the communication subsystem 212 may be configured for communication via a wireless telephone network, or a wired or wireless local- or wide-area network. In some embodiments, the communication subsystem 212 may allow computing system 200 to send and/or receive messages to and/or from other devices via a network such as the Internet.

According to one aspect of the present disclosure, a computing device is provided, including a processor configured to receive source code at a compiler. The source code may include at least one compound conditional having a plurality of conditions, and, for each condition of the plurality of conditions, a respective code block including one or more instructions to evaluate the condition. For each ordering of a plurality of orderings of the plurality of conditions, the processor may be further configured to determine that the ordering satisfies one or more legality constraints. For each ordering of the plurality of orderings that satisfy the one or more legality constraints, the processor may be further configured to determine a respective estimated computational cost for that ordering. The processor may be further configured to reorder the plurality of conditions to have an ordering that has a lowest estimated computational cost of the plurality of orderings that satisfy the one or more legality constraints.

According to this aspect, the source code may further include a first branch code block including one or more first branch evaluation instructions configured to be executed when the plurality of conditions are true. The source code may further include a second branch code block including one or more second branch evaluation instructions configured to be executed when at least one condition of the plurality of conditions is false.

According to this aspect, the one or more legality constraints may include a constraint that the source code includes one first branch code block and one second branch code block.

According to this aspect, the one or more legality constraints may include a constraint that the respective code block of each condition includes an instruction to proceed to a common target code block.

According to this aspect, the one or more legality constraints may include a constraint that a portion of the source code following a last code block of the respective code blocks of the plurality of conditions and preceding the common target code block has one entry point and one exit point.

According to this aspect, the one or more legality constraints may include a constraint that no instruction calls an undefined variable.

According to this aspect, each code block may be a basic block.

According to this aspect, at least one code block may include a plurality of basic blocks.

According to this aspect, the processor may be configured to determine the respective estimated computational cost for each ordering at least in part by assigning an estimated cost score to each instruction included in the ordering and summing the respective estimated cost scores assigned to each instruction.

According to another aspect of the present disclosure, a method performed by a processor of a computing device is provided. The method may include receiving source code at a compiler. The source code may include at least one compound conditional having a plurality of conditions, and, for each condition of the plurality of conditions, a respective code block including one or more instructions to evaluate the condition. For each ordering of a plurality of orderings of the plurality of conditions, the method may further include determining that the ordering satisfies one or more legality constraints. For each ordering of the plurality of orderings that satisfy the one or more legality constraints, the method may further include determining a respective estimated computational cost for that ordering. The method may further include reordering the plurality of conditions to have an ordering that has a lowest estimated computational cost of the plurality of orderings that satisfy the one or more legality constraints.

According to this aspect, the source code may further include a first branch code block including one or more first branch evaluation instructions configured to be executed when the plurality of conditions are true. The source code may further include a second branch code block including one or more second branch evaluation instructions configured to be executed when at least one condition of the plurality of conditions is false.

According to this aspect, the one or more legality constraints may include a constraint that the source code includes one first branch code block and one second branch code block.

According to this aspect, the one or more legality constraints may include a constraint that a portion of the source code following a last code block of the respective code blocks of the plurality of conditions and preceding the common target code block has one entry point and one exit point.

According to this aspect, the one or more legality constraints may include a constraint that no instruction calls an undefined variable.

According to this aspect, each code block may be a basic block.

According to this aspect, determining the respective estimated computational cost for each ordering may include assigning an estimated cost score to each instruction included in the ordering and summing the respective estimated cost scores assigned to each instruction.

According to another aspect of the present disclosure, a computing device is provided, including a processor configured to receive source code at a compiler. The source code may include a plurality of code blocks. For each ordering of a plurality of orderings of the plurality of code blocks, the processor may be further configured to determine that the ordering satisfies one or more legality constraints. For each ordering of the plurality of orderings that satisfy the one or more legality constraints, the processor may be further configured to determine a respective estimated computational cost for that ordering. The processor may be further configured to reorder the plurality of code blocks to have an ordering that has a lowest estimated computational cost of the plurality of orderings that satisfy the one or more legality constraints.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising a processor configured to:
during an execution of a compiler:
receive source code at the compiler, wherein the source code includes:
at least one compound conditional having a plurality of conditions configured to be evaluated as part of execution of assembly code compiled from the source code to determine which of a plurality of branch code blocks of the assembly code are to be executed as part of the execution of the assembly code,
wherein each condition of the plurality of conditions includes a code block that includes one or more instructions to evaluate the condition as part of execution of the assembly code;
determine a plurality of orderings of the conditions included in the compound conditional;
determine that two or more orderings of the plurality of orderings of the plurality of conditions satisfy one or more legality constraints on a syntactic structure of the one or more instructions of each of the plurality of conditions, and that at least one ordering of the plurality of orderings does not satisfy the one or more legality constraints;
only for each ordering of the plurality of orderings that satisfy the one or more legality constraints, during the execution of the compiler and subsequently to determining that the ordering satisfies the one or more legality constraints, determine a respective estimated computational cost for that ordering without determining at least one respective computational cost for the at least one ordering that does not satisfy the one or more legality constraints;
wherein the at least one respective computational cost for each ordering of the plurality of orderings that satisfy the one or more legality constraints is determined at least in part by:
assigning an estimated cost score to each instruction included in the ordering as specified by an estimated computational cost table that maps a plurality of instruction types to a respective plurality of estimated cost scores, and
summing the respective estimated cost scores assigned to each instruction;
reorder the plurality of conditions to have an ordering that has a lowest estimated computational cost of the plurality of orderings that satisfy the one or more legality constraints; and
compile the source code with the reordered plurality of conditions into the assembly code.

2. The computing device of claim 1, wherein the source code further includes:
a first branch code block including one or more first branch evaluation instructions configured to be executed when the plurality of conditions are true; and
a second branch code block including one or more second branch evaluation instructions configured to be executed when at least one condition of the plurality of conditions is false.

3. The computing device of claim 2, wherein the one or more legality constraints include a constraint that the source code includes one first branch code block and one second branch code block.

4. The computing device of claim 1, wherein the one or more legality constraints include a constraint that the respective code block of each condition includes an instruction to proceed to a common target code block.

5. The computing device of claim 4, wherein the one or more legality constraints include a constraint that a portion of the source code that follows a last code block of the respective code blocks of the plurality of conditions and that precedes the common target code block has one entry point and one exit point.

6. The computing device of claim 1, wherein the one or more legality constraints include a constraint that no instruction calls an undefined variable.

7. The computing device of claim 1, wherein each code block is a basic block.

8. The computing device of claim 1, wherein at least one code block includes a plurality of basic blocks.

9. The computing device of claim 1, wherein the compound conditional and the plurality of conditions included in the compound conditional are each configured to be evaluated to respective Boolean values when the assembly code is executed.

10. The computing device of claim 1, wherein each of the plurality of instruction types is a respective type of operation, and where each type of operation has an associated estimated integer cost and an estimated floating-point cost, the estimated integer cost being an estimated cost score of the type of operation when performed using integer computation, and the estimated floating-point cost being an estimated cost score of the type of operation when performed using floating point computation.

11. The computing device of claim 10, wherein the types of operations include addition, subtraction, comparison, negation, division, remainder, AND, OR, XOR, minimum, maximum, load, and/or store.

12. A method performed by a processor of a computing device, the method comprising:
    during an execution of a compiler:
        receiving source code at the compiler, wherein the source code includes:
            at least one compound conditional having a plurality of conditions configured to be evaluated as part of execution of assembly code compiled from the source code to determine which of a plurality of branch code blocks of the assembly code are to be executed as part of the execution of the assembly code,
            wherein each condition of the plurality of conditions includes a code block that includes one or more instructions to evaluate the condition as part of execution of the assembly code;
        determining a plurality of orderings of the conditions included in the compound conditional;
        determining that two or more orderings of the plurality of orderings of the plurality of conditions satisfy one or more legality constraints on a syntactic structure of the one or more instructions of each of the plurality of conditions, and that at least one ordering of the plurality of orderings does not satisfy the one or more legality constraints;
        only for each ordering of the plurality of orderings that satisfy the one or more legality constraints, during the execution of the compiler and subsequently to determining that the ordering satisfies the one or more legality constraints, determining a respective estimated computational cost for that ordering without determining at least one respective computational cost for the at least one ordering that does not satisfy the one or more legality constraints,
        wherein determining the at least one respective computational cost for each ordering of the plurality of orderings that satisfy the one or more legality constraints includes:
            assigning an estimated cost score to each instruction included in the ordering as specified by an estimated computational cost table that maps a plurality of instruction types to a respective plurality of estimated cost scores, and
            summing the respective estimated cost scores assigned to each instruction;
        reordering the plurality of conditions to have an ordering that has a lowest estimated computational cost of the plurality of orderings that satisfy the one or more legality constraints; and
        compiling the source code with the reordered plurality of conditions into the assembly code.

13. The method of claim 12, wherein the source code further includes:
    a first branch code block including one or more first branch evaluation instructions configured to be executed when the plurality of conditions are true; and
    a second branch code block including one or more second branch evaluation instructions configured to be executed when at least one condition of the plurality of conditions is false.

14. The method of claim 13, wherein the one or more legality constraints include a constraint that the source code includes one first branch code block and one second branch code block.

15. The method of claim 12, wherein the one or more legality constraints include a constraint that the respective code block of each condition includes an instruction to proceed to a common target code block.

16. The method of claim 12, wherein the one or more legality constraints include a constraint that a portion of the source code that follows a last code block of the respective code blocks of the plurality of conditions and that precedes the common target code block has one entry point and one exit point.

17. The method of claim 12, wherein the one or more legality constraints include a constraint that no instruction calls an undefined variable.

18. The method of claim 12, wherein each code block is a basic block.

19. The method of claim 12, wherein at least one code block includes a plurality of basic blocks.

20. The method of claim 12, wherein each of the plurality of instruction types is a respective type of operation, and where each type of operation has an associated estimated integer cost and an estimated floating-point cost, the estimated integer cost being an estimated cost score of the type of operation when performed using integer computation, and the estimated floating-point cost being an estimated cost score of the type of operation when performed using floating point computation.

21. The method of claim 20, wherein the types of operations include addition, subtraction, comparison, negation, division, remainder, AND, OR, XOR, minimum, maximum, load, and/or store.

22. A computing device comprising a processor configured to:
    during an execution of a compiler:
        receive source code at the compiler, wherein the source code includes a plurality of code blocks that are included in a compound conditional and are configured to be evaluated as part of execution of assembly code compiled from the source code to determine which of a plurality of branch code blocks of the assembly code are to be executed as part of the execution of the assembly code;
        determine a plurality of orderings of the conditions included in the compound conditional;
        determine that two or more orderings of the plurality of orderings of the plurality of code blocks satisfy one or more legality constraints on a syntactic structure of one or more instructions of each of the plurality of code blocks, and that at least one ordering of the plurality of orderings does not satisfy the one or more legality constraints;

only for each ordering of the plurality of orderings that satisfy the one or more legality constraints, during the execution of the compiler and subsequently to determining that the ordering satisfies the one or more legality constraints, determine a respective estimated computational cost for that ordering without determining at least one respective computational cost for the at least one ordering that does not satisfy the one or more legality constraints, wherein the at least one respective computational cost for each ordering of the plurality of orderings that satisfy the one or more legality constraints is determined at least in part by:
   assigning an estimated cost score to each instruction included in the ordering as specified by an estimated computational cost table that maps a plurality of instruction types to a respective plurality of estimated cost scores, and
   summing the respective estimated cost scores assigned to each instruction;

reorder the plurality of code blocks to have an ordering that has a lowest estimated computational cost of the plurality of orderings that satisfy the one or more legality constraints; and compile the source code with the reordered plurality of conditions into the assembly code.

\* \* \* \* \*